US009501063B2

United States Patent
Masuda

(10) Patent No.: US 9,501,063 B2
(45) Date of Patent: Nov. 22, 2016

(54) ELECTRIC LINEAR MOTION ACTUATOR

(71) Applicant: Yui Masuda, Shizuoka (JP)

(72) Inventor: Yui Masuda, Shizuoka (JP)

(73) Assignee: NTN Corporation, Osaka (JP)

( * ) Notice: Subject to any disclaimer, the term of this patent is extended or adjusted under 35 U.S.C. 154(b) by 9 days.

(21) Appl. No.: 14/648,722

(22) PCT Filed: Nov. 12, 2013

(86) PCT No.: PCT/JP2013/080503
§ 371 (c)(1),
(2) Date: Jun. 1, 2015

(87) PCT Pub. No.: WO2014/087813
PCT Pub. Date: Jun. 12, 2014

(65) Prior Publication Data
US 2015/0316933 A1     Nov. 5, 2015

(30) Foreign Application Priority Data

Dec. 3, 2012   (JP) .................................. 2012-264082

(51) Int. Cl.
*H02K 7/10* (2006.01)
*G05D 3/12* (2006.01)
(Continued)

(52) U.S. Cl.
CPC ................. *G05D 3/12* (2013.01); *F16D 65/18* (2013.01); *G05B 19/19* (2013.01); *H02K 7/06* (2013.01);
(Continued)

(58) Field of Classification Search
CPC ........ G06F 17/00; F16D 66/02; F16D 65/18; H02P 3/12; H02P 3/10; B60L 7/22; G05D 3/12; B60T 17/22
USPC ......... 318/612, 614, 687, 55, 56, 57, 60, 87, 318/119, 135, 139, 148, 700, 400.01, 318/400.09, 400.14, 400.15, 725, 727, 742, 318/757, 759, 765, 779, 799, 800, 261, 265, 318/273, 362, 363, 364, 365, 366, 369, 370, 318/371, 372, 373, 374, 375, 376, 432; 188/24.16, 24.22, 79.55, 162, 218 XL, 188/240; 388/800
See application file for complete search history.

(56) References Cited

U.S. PATENT DOCUMENTS 3,572,565 A   3/1971   Steggall
4,995,483 A   2/1991   Moseley et al.
(Continued)

FOREIGN PATENT DOCUMENTS

EP   1 124 073   8/2001
JP   07-002441   1/1995
(Continued)

OTHER PUBLICATIONS

Extended European Search Report issued Dec. 15, 2015 in corresponding European Application No. 13860531.3.
(Continued)

*Primary Examiner* — Antony M Paul
(74) *Attorney, Agent, or Firm* — Wenderoth, Lind & Ponack, L.L.P.

(57) ABSTRACT

An electric linear motion actuator includes an electric motor, a motion converting mechanism that converts the rotational motion of the electric motor into a linear motion of a linear moving member, a load sensor that detects the magnitude of the load applied to the brake disk from the linear moving member, and a controller that performs feedback control on the electric motor based on the difference between the load detected by the load sensor and a load command value. The controller reduces the number of revolutions of the electric motor when the linear moving member moves into a predetermined zone immediately before the position where the clearance between the linear moving member and the brake disk becomes zero.

8 Claims, 11 Drawing Sheets

(51) Int. Cl.
  *F16D 65/18* (2006.01)
  *H02P 3/26* (2006.01)
  *H02P 6/16* (2016.01)
  *H02K 7/06* (2006.01)
  *G05B 19/19* (2006.01)
  *H02P 6/00* (2016.01)
  *F16D 121/24* (2012.01)
  *F16D 125/40* (2012.01)
  *F16D 125/50* (2012.01)
  *F16D 127/06* (2012.01)
  *F16D 129/08* (2012.01)
  *F16H 25/20* (2006.01)

(52) U.S. Cl.
  CPC ............... H02K 11/24 (2016.01); H02P 3/26 (2013.01); H02P 6/006 (2013.01); H02P 6/16 (2013.01); *F16D 2121/24* (2013.01); *F16D 2125/40* (2013.01); *F16D 2125/50* (2013.01); *F16D 2127/06* (2013.01); *F16D 2129/08* (2013.01); *F16H 25/20* (2013.01); *G05B 2219/43194* (2013.01); *G05B 2219/49141* (2013.01)

(56) References Cited

U.S. PATENT DOCUMENTS

| | | |
|---|---|---|
| 6,000,507 A | 12/1999 | Böhm et al. |
| 2002/0026272 A1 | 2/2002 | Yamamoto |
| 2009/0281702 A1* | 11/2009 | Cahill ................ F16D 66/025 701/78 |
| 2013/0048443 A1 | 2/2013 | Muramatsu et al. |

FOREIGN PATENT DOCUMENTS

| | | |
|---|---|---|
| JP | 09-137841 | 5/1997 |
| JP | 2000-264186 | 9/2000 |
| JP | 2002-067906 | 3/2002 |
| JP | 2007-147081 | 6/2007 |
| JP | 2011-241851 | 12/2011 |

OTHER PUBLICATIONS

International Search Report issued Feb. 18, 2015 in International (PCT) Application No. PCT/JP2013/080503.
Written Opinion of the International Searching Authority issued Feb. 18, 2015 in International (PCT) Application No. PCT/JP2013/080503 (with English translation).

* cited by examiner

ELECTRIC LINEAR MOTION ACTUATOR

TECHNICAL FIELD

The present invention relates to an electric linear motion actuator that converts the rotational motion of an electric motor into a linear motion of a linear moving member that applies a load to a target.

BACKGROUND ART

There has been used a hydraulic brake device that is employed in a brake device for vehicles. The hydraulic brake device includes a hydraulic cylinder that presses a friction pad against a brake disk to generate a braking force. Besides the hydraulic brake device, an electric brake device has been paid attention because of an introduction of a brake control system such as an ABS (antilock brake system), which electric brake device uses no hydraulic circuit.

The electric brake device includes an electric linear motion actuator wherein the rotational motion of an electric motor is converted into a linear motion of a linear moving member. The linear motion is used to press a friction pad against a brake disk to generate a braking force.

Such an electric brake device is disclosed in the below-identified Patent Document 1, for example. The electric brake device of Patent Document 1 includes an electric motor and a linear moving member integral with a friction pad that linearly moves between a standby position and a load applying position. The standby position is a place where the friction pad is spaced from the brake disk with a predetermined clearance between them, and the load applying position is a place where the friction pad contacts the brake pad and applies a load to the brake pad. The electric brake device also includes a motion converting mechanism that converts the rotational motion of the electric motor into a linear motion of the liner moving member. The device further includes a load sensor that detects the magnitude of a load that is applied to the brake disk through the friction pad. The electric motor is controlled by the load sensor on the basis of the magnitude of the load detected by the load sensor.

PRIOR ART REFERENCES

Patent Documents

Patent Document 1: Japanese Laid-open Patent Application Publication No. 2011-241851
Patent Document 2: Japanese Laid-open Patent Application Publication No. 2000-264186

DISCLOSURE OF THE INVENTION

Problems to be Solved by the Invention

The electric brake device of Patent Document 1, however, adversely involves an excessive overshoot that is generated right after the clearance between the friction pad and the brake disk becomes zero, due to a non-linearity in the relation between the position of the friction pad and the load detected by the load sensor, when the friction pad moves to the brake disk to apply a load to the brake disk.

Specifically, in this electric brake device, such an overshoot will be described below with a case wherein the friction pad is moved from the standby position, where the friction pad is spaced apart from the brake disk with a predetermined clearance therebetween, to the load applying position, where the friction pad is in contact with, and applies a load to, the brake disk, thereby applying a predetermined target load to the brake disk. In this case, the load sensor continues to detect a load of zero or nearly zero before the clearance between the friction pad and the brake disk becomes zero, so that the difference between the load detected by the load sensor and the load command value remains large. Thus, the friction pad contacts the brake disk with the electric motor rotating at a relatively high speed (i.e., with the electric motor having large inertial energy). Immediately thereafter, due to the inertial energy of the electric motor, the load detected by the load sensor sharply and suddenly increases, and could excessively overshoot the load command value. The overshoot is liable to be generated especially if the target load is small, and induces a brake shock that adversely affects to the brake feeling.

Patent Document 2 discloses an electric brake device that restrains generation of an overshoot that happens right after the clearance between the friction pad and the brake disk becomes zero. This electric brake device detects the magnitude of a load to be applied from the friction pad disposed at the distal end of the linear moving member to the brake disk, on the basis of the magnitude of a current supplied to the electric motor. Then, the electric brake device performs feedback control on the electric motor on the basis of the difference variation between the load detected by the load sensor and the load command value so that the load to be applied from the friction pad to the brake disk comes to the load command value.

In the electric brake device of Patent Document 2, in order to prevent an overshoot that happens right after the clearance between the friction pad and the brake disk becomes zero, the control gain of the feedback control is set at a smaller value, thereby keeping the driving force of the electric motor at a low level, until the above clearance becomes zero. Then, after the clearance between the friction pad and the brake disk becomes zero, the electric brake device increases the control gain of the feedback control to thereby increase the driving force of the electric motor, thus increasing the load to be applied from the friction pad to the brake disk up to the target load.

The electric brake device of Patent Document 2, however, has an inferior brake response, since the electric motor is driven under a small value of control gain in the feedback control all the way through from the initial movement of the friction pad to the position where the clearance between the friction pad and the brake disk becomes zero. The brake response is particularly slow when the electric brake device provides a small braking force (i.e., when the magnitude of the load command value is small).

It is therefore an object of the present invention to provide an electric linear motion actuator that avoids generation of an overshoot and has a good responsiveness.

Means for Solving the Problems

The inventors of the present invention have made an electric linear motion actuator having the following structure:
An electric linear motion actuator comprising:
an electric motor;
a linear moving member capable of moving between a standby position where the linear moving member is spaced apart from a target with a predetermined clearance between the linear moving member and the target and a load applying position where the linear moving member contacts the target to apply a load to the target;

a motion converting mechanism that converts the rotational motion of the electric motor into a linear motion of the linear moving member;

a load sensor that detects the magnitude of the load applied to the target from the linear moving member; and a controller configured to perform a feedback control in which based on the difference between the load detected by the load sensor and a load command value, the electric motor is controlled so that the load applied from the linear moving member to the target becomes equal to the load command value, wherein the controller comprises an overshoot suppression control means configured to reduce the number of revolutions of the electric motor when the linear moving member moves from the standby position toward the load applying position to apply a load to the target and moves into a predetermined zone immediately before the position where the clearance between the linear moving member and the target becomes zero.

The electric brake device described above operates such that the liner motion member moves from the standby position, which is away from the target with a predetermined clearance, to the load applying position, where the linear moving member contacts the target and applies load to the target, to thereby apply a target load to the target. In this arrangement, the number of revolutions of the electric motor is reduced when the linear moving member comes to the predetermined zone, which is immediately before the position where the clearance between the linear moving member and the target becomes zero. This can restrict generation of an overshoot that can otherwise be generated right after the clearance between the linear moving member and the target becomes zero. In addition, the number of revolutions of the electric motor decreases only in the predetermined zone, which is immediately before the position where the clearance between the linear moving member and the target becomes zero, so that the electric motor rotates at a relatively high speed until the linear moving member comes to the predetermined zone. Thus, the linear moving member can move faster than a case where the number of revolutions of the electric motor is reduced in the entire zone from the position where the linear moving member begins to move to the position where the clearance between the linear moving member and the target becomes zero. This can provide the present invention an excellent responsiveness.

Preferably, the electric linear motion actuator further comprises a rotation angle sensor that detects the rotation angle of the electric motor, wherein the overshoot suppression control means is configured to determine whether the linear moving member has moved into the predetermined zone, which is immediately before the position where the clearance between the linear moving member and the target becomes zero, on the basis of the rotation angle of the electric motor detected by the rotation angle sensor.

With such an arrangement, the rotation angle sensor can detect, on the basis of the rotation angle of the electric motor detected by the rotation angle sensor, the position of the linear moving member with high resolution. Thus, the detection by the rotation angle sensor can determine highly accurately whether the linear moving member has moved into the predetermined zone, which is immediately before the position where the clearance between the linear moving member and the target becomes zero.

Preferably, the overshoot suppression control means is configured to calculate a range of the rotation angle of the electric motor corresponding to the predetermined zone, which is immediately before the position where the clearance between the linear moving member and the target becomes zero, based on the magnitude of the predetermined load detected by the load sensor while the linear moving member is applying a load to the target, and with reference to the rotation angle of the electric motor detected by the rotation angle sensor when the magnitude of the predetermined load is detected by the load sensor; and the overshoot suppression control means is further configured to determine that the linear moving member has moved into the predetermined zone, which is immediately before the position where the clearance between the linear moving member and the target becomes zero, when the rotation angle of the electric motor detected by the rotation angle sensor moves within the range of the rotation angle.

Thus, if the rotation angle of the electric motor, at the time the clearance between the linear moving member and the target becomes zero, is changed by wear of a friction pad or the like, the range of a rotation angle of the electric motor corresponding to the predetermined zone immediately before the position where the clearance between the linear moving member (friction pad) and the target becomes zero can be calculated based on the changed rotation angle of the electric motor. Accordingly, it is possible to stably and accurately determine, for a long time of period, whether the linear moving member comes into the predetermined zone immediately before the position where the clearance between the linear moving member and the target becomes zero.

The overshoot suppression control means may be configured to change the voltage applied to the electric motor such that the number of revolutions of the electric motor decreases, when the linear moving member moves into the predetermined zone, which is immediately before the position where the clearance between the linear moving member and the target becomes zero.

Alternatively, the overshoot suppression control means may be configured to reduce the voltage to be applied to the electric motor to a predetermined value, when the linear moving member moves into the predetermined zone, which is immediately before the position where the clearance between the linear moving member and the target becomes zero.

Further alternatively, the overshoot suppression control means may be configured to perform feedback control on the electric motor in which based on the difference between the number of revolutions of the electric motor and a predetermined small number of revolutions, the number of revolutions of the electric motor is reduced to the predetermined small number of revolutions, when the linear moving member moves into the predetermined zone, which is immediately before the position where the clearance between the linear moving member and the target becomes zero.

If the electric motor is driven by a pulse voltage generated by repeatedly and discontinuously applying a constant voltage, the overshoot suppression control means may be configured to reduce the ratio of the turned-on time during which the constant voltage is being applied to the sum of the turned-on time and the turned-off time during which the constant voltage is not being applied, when the linear moving member moves into the predetermined zone, which is immediately before the position where the clearance between the linear moving member and the target becomes zero.

If the electric motor is driven by a pulse voltage generated by being repeatedly turned on and turned off, the overshoot suppression control means may be configured to reduce the pulse amplitude of the pulse voltage, which is applied to the electric motor, when the linear moving member moves into the predetermined zone, which is immediately before the position where the clearance between the linear moving member and the target becomes zero.

Effects of the Invention

The electric linear motion actuator described above operates such that the liner motion member moves from the standby position, which is away from the target with a predetermined clearance, to the load applying position, where the linear moving member contacts the target and applies a load to the target, to thereby apply the target load to the target. In this arrangement, the number of revolutions of the electric motor is reduced when the linear moving member moves into the predetermined zone immediately before the position where the clearance between the linear moving member and the target becomes zero. This can restrict generation of an overshoot that can otherwise be generated right after the clearance between the linear moving member and the target becomes zero. In addition, the number of revolutions of the electric motor decreases only in the predetermined zone immediately before the position where the clearance between the linear moving member and the target becomes zero, so that the electric motor rotates at a relatively high speed until the linear moving member moves into the predetermined zone. Thus, the linear moving member can move faster than a case where the number of revolutions of the electric motor is reduced in the entire zone from the position where the linear moving member begins to move to the position where the clearance between the linear moving member and the target becomes zero. This can provide the actuator of the present invention an excellent responsiveness.

BRIEF DESCRIPTION OF DRAWINGS

FIG. 8 illustrates an embodiment of the present invention, wherein: FIG. 8(a) illustrates changes of a load command value and the load detected by a sensor, in a time sequence, at a time a friction pad moves from a standby position, which is away from a brake disk with a predetermined clearance, to a load applying position to come into contact with the brake disk to thereby apply a predetermined target load to the brake disk; FIG. 8(b) illustrates a change of a voltage, in a time sequence, applied to the electric motor; and FIG. 8(c) illustrates the number of revolutions of the electric motor in a time sequence;

FIG. 9 illustrates a comparative example with respect to FIG. 8: wherein: FIG. 9(a) illustrates changes of the load command value and the load detected by the sensor, in a time sequence, at a time the friction pad moves from the standby position, which is away from the brake disk with a predetermined clearance, to the load applying position to come into contact with the brake disk to thereby apply the predetermined target load to the brake disk; FIG. 9(b) illustrates a change of a voltage, in a time sequence, applied to the electric motor; and FIG. 9(c) illustrates the number of revolutions of the electric motor in a time sequence;

FIG. 13 illustrates the relation between a rotation disk and a linear motion disk wherein: FIG. 13(a) illustrates the relation between a ball and inclined grooves illustrated in FIG. 11; and FIG. 13(b) illustrates a state where the rotation disk moved relative to the linear motion disk from the state of FIG. 13(a), thereby making an increased distance between them.

BEST MODE FOR CARRYING OUT THE INVENTION

Figure 1:
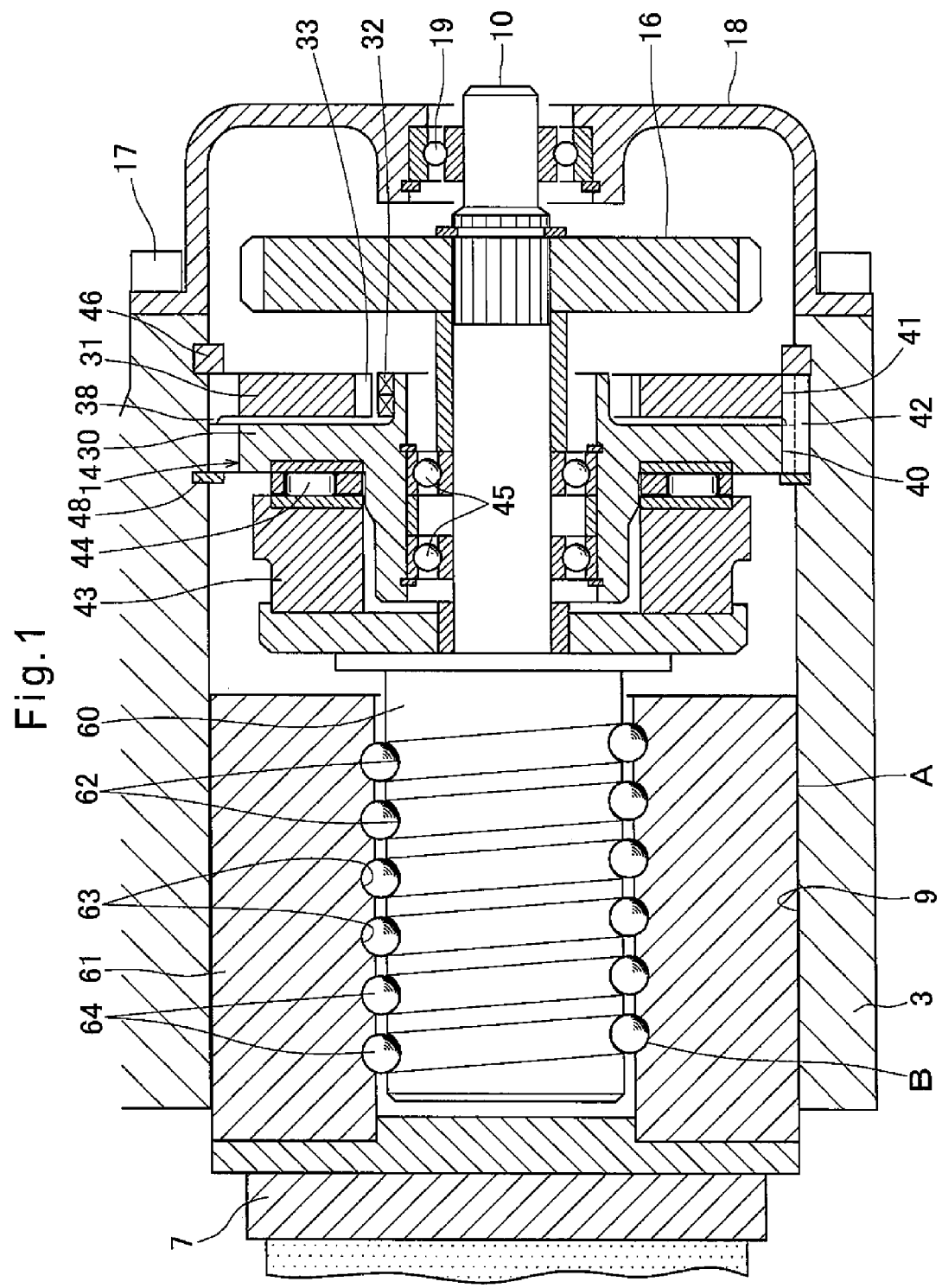
FIG. 1 is a sectional view of an electric brake device including an electric linear motion actuator according to an embodiment of the present invention.

FIG. 1 shows a vehicular electric brake device including an electric linear motion actuator 1 according to an embodiment of the present invention. The electric brake device includes a caliper body 6 including facing members 3 and 4 facing each other on both sides of a brake disk 2 that integrally rotates with a wheel and coupled together through a bridge 5. The electric brake device further includes a pair of right and left friction pads 7 and 8. The electric linear motion actuator 1 is incorporated in a mounting hole 9 formed in the facing member 3 and open at the surface of the facing member 3 facing the brake disk 2.

The friction pads 7 and 8 are disposed between the respective facing members 3 and 4 and the brake disk 2, and are supported so as to be movable in the axial direction of the brake disk 2 with respect to a mount (not illustrated) fixed to a knuckle (not illustrated) supporting the wheel. The caliper body 6 is supported by the mount so as to be slidable in the axial direction of the brake disk 2.

Figure 2:
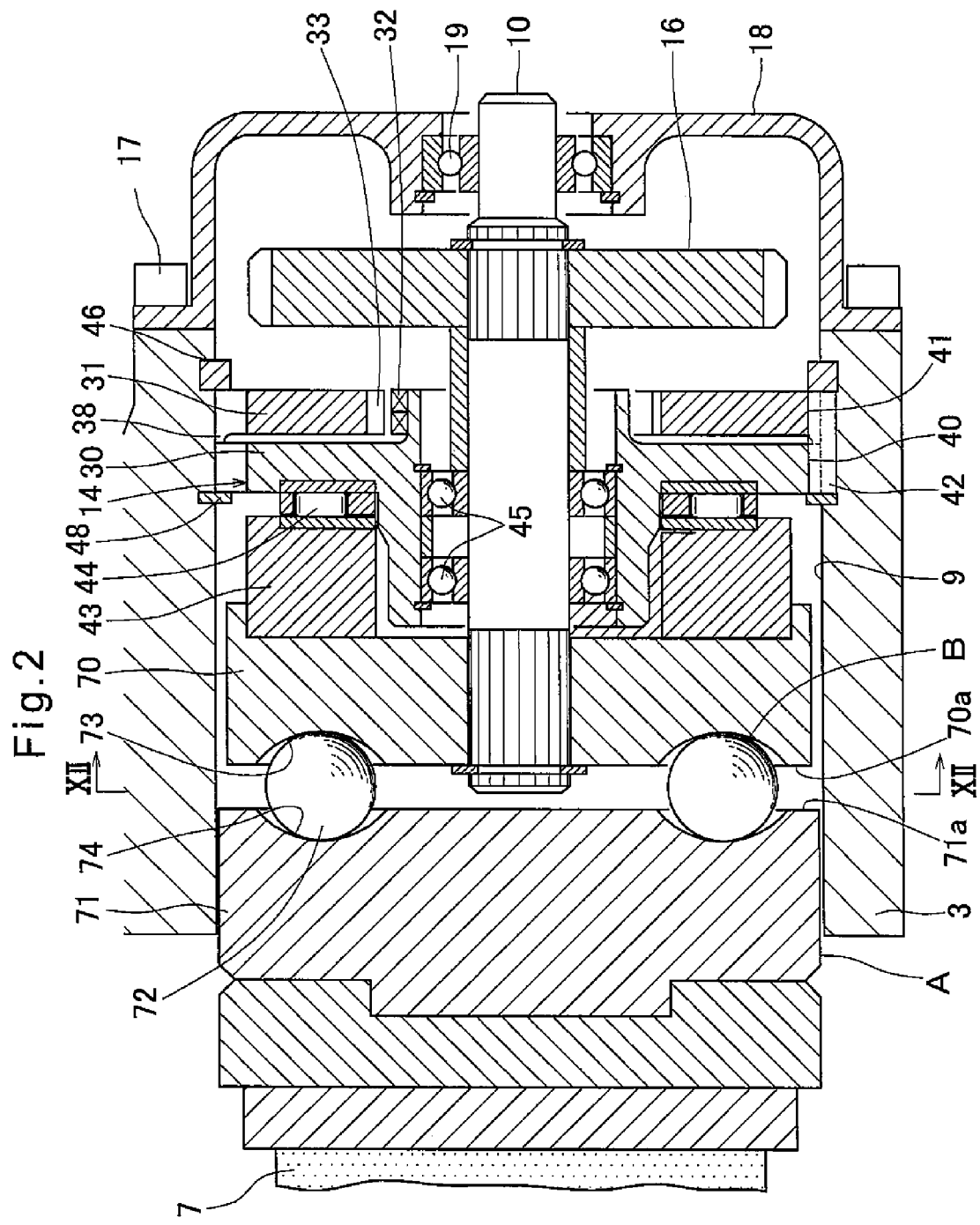
FIG. 2 is an enlarged sectional view of the electric linear motion actuator of FIG. 1 with a surrounding area.

As illustrated in FIG. 2, the electric linear motion actuator 1 includes: a rotary shaft 10; a plurality of planetary rollers 11 in rolling contact with a cylindrical outer circumference surface of the rotary shaft 10; an outer ring member 12 surrounding the planetary rollers 11; a carrier 13 supporting the planetary rollers 11 in such a manner that the rollers 11 can rotate about their axes and revolve around the shaft 10; and a load sensor 14 disposed axially rearwardly of the outer ring member 12.

The rotary shaft 10 is rotated by an electric motor 15 illustrated in FIG. 1 via a gear 16. The rotary shaft 10 is inserted in the mounting hole 9, which axially extends through the facing member, such that one end of the shaft 10 projects from the axially rear opening of the mounting hole 9. The gear 16 is rotationally fixed to the projecting portion of the rotary shaft 10 by means of splines. The gear 16 is covered with a lid 18 that is fixed in position by bolts 17 to close the axially rear opening of the mounting hole 9. A bearing 19 is mounted in the lid 18 to rotatably support the rotary shaft 10.

Figure 3:
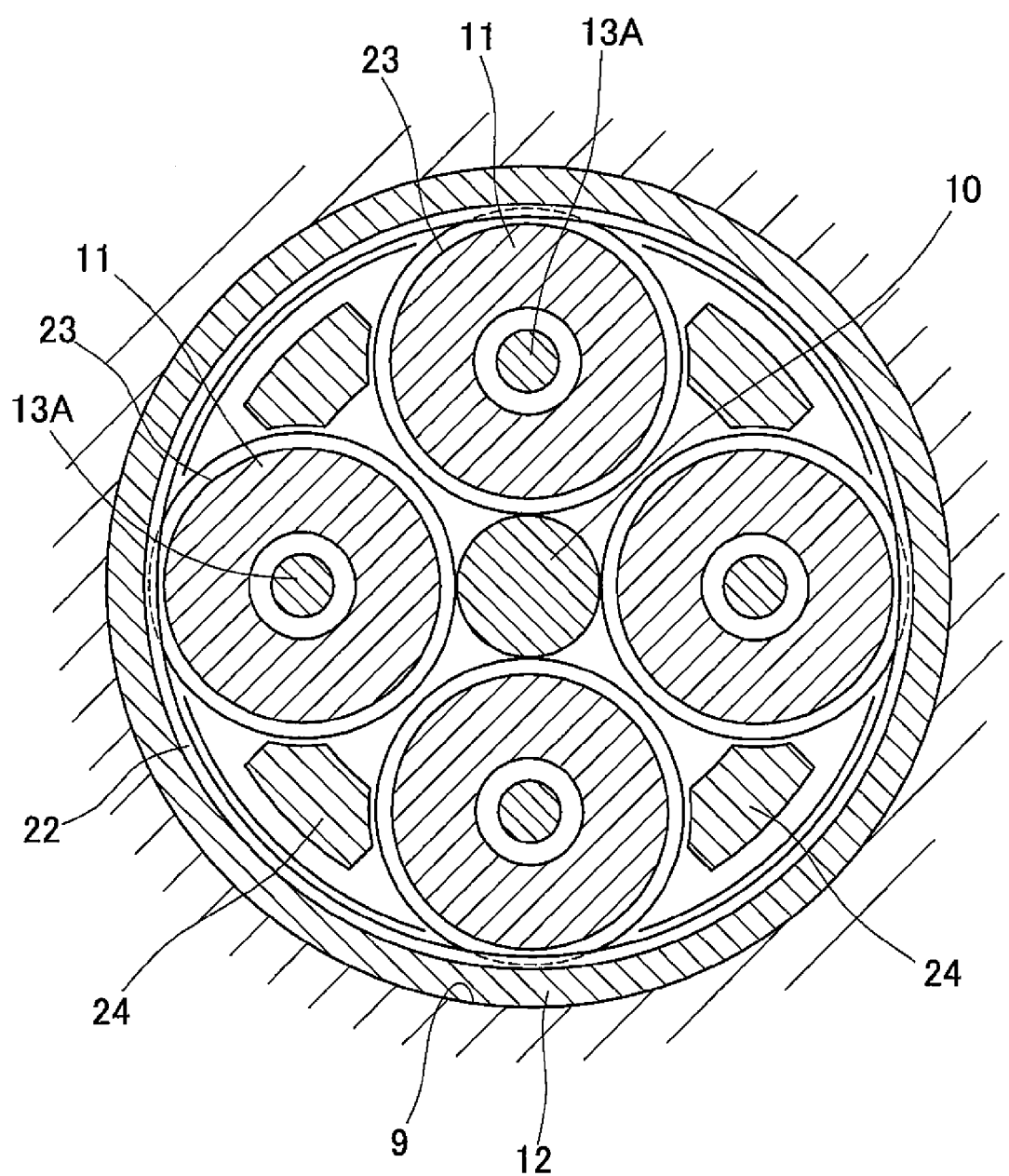
FIG. 3 is a sectional view along line III-III in FIG. 2.

As illustrated in FIG. 3, the planetary rollers 11 are in rolling contact with the cylindrical outer circumference surface of the rotary shaft 10, so that when the rotary shaft 10 rotates, the planetary rollers 11 also rotate by friction between the rotary shaft 10 and the planetary rollers 11. The planetary rollers 11 are circumferentially disposed at regular intervals.

As illustrated in FIG. 2, the outer ring member 12 is mounted in the mounting hole 9 formed in the facing member 3 of the caliper body 6, and is slidably supported in the axial direction by the inner circumference of the mounting hole 9. The outer ring member 12 has at the axially front end thereof an engaging recessed portion 21 in which an engaging projected portion 20 provided on the rear surface of the friction pad 7 is engaged, so that the outer ring member 12 is rotationally fixed relative to the caliper body 6.

The outer ring member 12 is provided at the inner circumference thereof with a helical rib 22, and the planetary rollers 11 each are provided at the outer circumference thereof with circumferential grooves 23 in which the helical rib 22 is engaged. When the planetary rollers 11 rotate, the outer ring member 12 moves in the axial direction, as the circumferential grooves 23 of the rollers 11 guide the helical rib 22 of the outer ring member 12. The circumferential grooves 23 provided on the outer circumference of each planetary roller 11 have a lead angle of zero degree. In place of the circumferential grooves 23, there may be provided a helical groove having a lead angle that is different from that of the helical rib 22.

The carrier 13 includes carrier pins 13A that rotatably support the respective planetary rollers 11, an annular carrier plate 13C that retains circumferentially constant distances between the axially front ends of the carrier pins 13A, and an annular carrier body 13B that retains circumferentially constant distances between the axially rear ends of the carrier pins 13A. The carrier plate 13C faces the carrier body 13B in the axial direction with the planetary rollers 11 disposed therebetween, and is connected to the carrier body 13B via connecting bars 24 each disposed between two planetary rollers 11 circumferentially neighboring with each other.

The carrier body 13B is supported by the rotary shaft 10 via a sliding bearing 25 so as to be rotatable relative to the rotary shaft 10. A thrust bearing 26 is disposed between each of the planetary rollers 11 and the carrier body 13B, whereby rotation of the planetary roller 11 is not transmitted to the carrier body 13B. The thrust bearings 26 rotatably support the respective planetary rollers 11.

The plurality of carrier pins 13A are circumferentially disposed at regular intervals and are biased radially inwardly by contraction ring springs 27 each wrapped around the carrier pins 13A. Under the biasing force of the contraction ring springs 27, the outer circumferences of the planetary rollers 11 are pressed against the outer circumference of the rotary shaft 10, whereby the planetary rollers 11 and the rotary shaft 10 do not slip with each other. The contraction ring springs 27 are provided at the respective two ends of the carrier pins 13A so that the biasing force of the contraction ring springs 27 act on the planetary rollers 11 over the entire axial length thereof.

The outer ring member 12 and the friction pad 7 illustrated in FIG. 1 and FIG. 2 constitute a linear moving member A that linearly moves between a standby position where the member A is apart from the brake disk 2 for a predetermined clearance (e.g., a clearance of 0.1 mm, as the sum of the gaps on both sides of the brake disk 2), and a load applying position where the friction pad 7 contacts the brake disk 2 to apply a load to the disk 2 (i.e., a position where clearances on both sides of the brake disk 2 are zero).

The following members constitute a motion converting mechanism B which converts the rotational motion of the electric motor 15 into a linear motion of the linear moving member A (the outer ring member 12 and the friction pad 7): the rotary shaft 10, which is rotated by the electric motor 15; the plurality of planetary rollers 11, which are in rolling contact with the cylindrical outer circumference surface of the rotary shaft 10; the carrier 13, which supports the planetary rollers 11 rotatably and revolvaly and is not movable in the axial direction; the outer ring member 12, which surrounds the planetary rollers 11; the helical rib 22, which is provided on the inner circumference of the outer ring member 12; and the circumferential grooves 23, which are provided on the outer circumferences of the planetary rollers 11 and in which the helical rib 22 is engaged.

The load sensor 14 includes a flange member 30 and a support member 31 which have both annular plate shapes and face each other while being spaced apart from each other, in the axial direction. The load sensor 14 also includes a magnetic target 32 that generates a magnetic field, and a magnetic sensor element 33 that detects the magnitude of the magnetic field. The support member 31 is fitted in the mounting hole 9 so as to be positioned axially rearwardly of the flange member 30.

Figure 4:
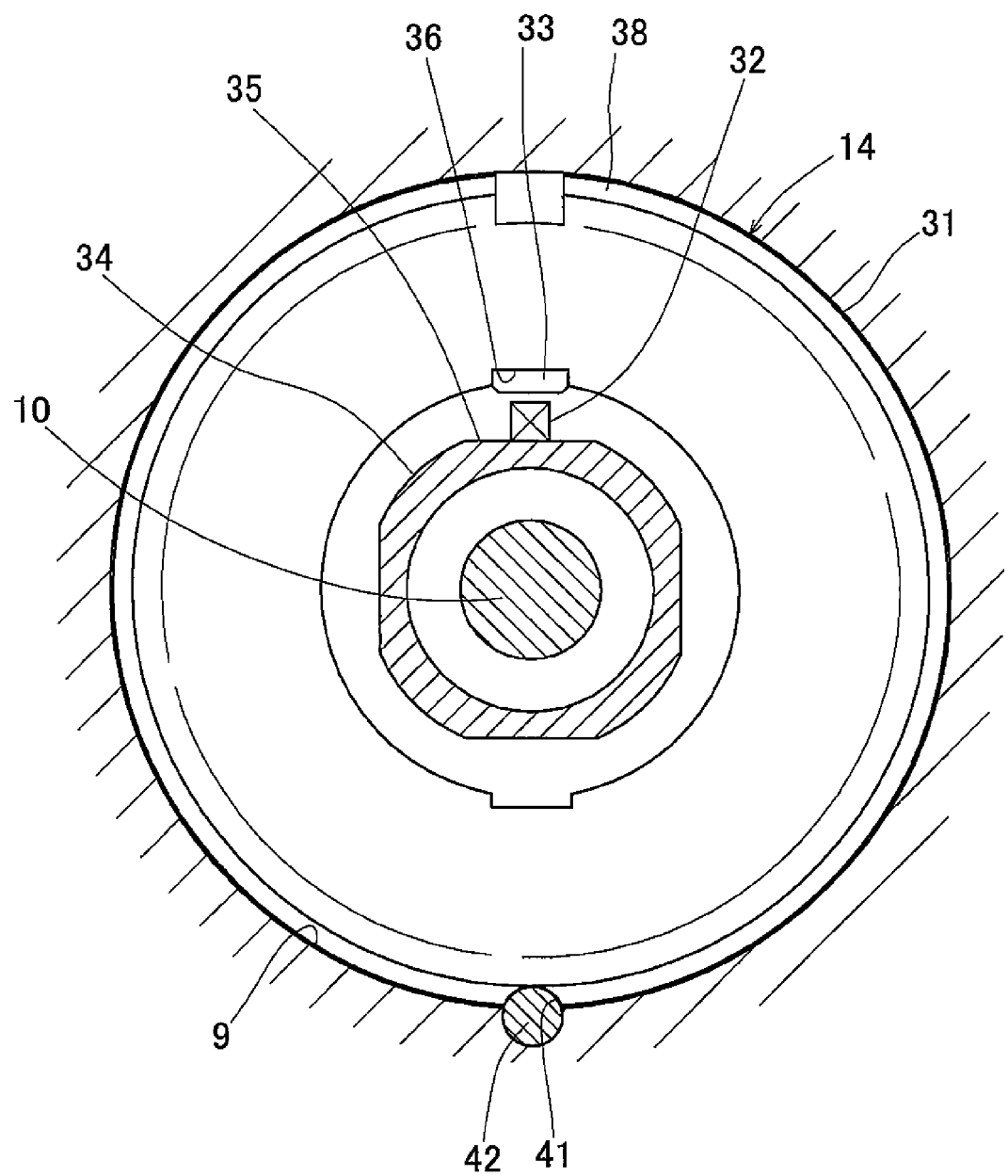
FIG. 4 is a sectional view along line IV-IV in FIG. 2.
Figure 5:
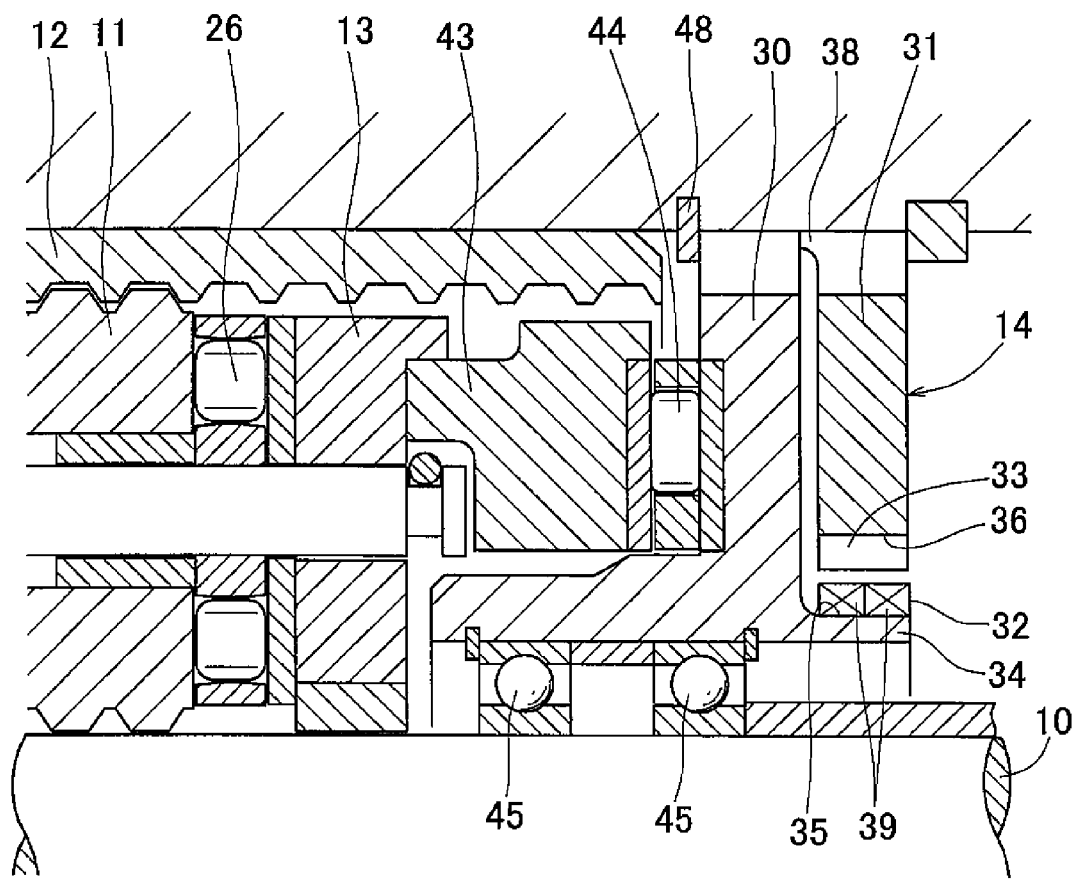
FIG. 5 is an enlarged sectional view of a load sensor and a surrounding area illustrated in FIG. 2.

As illustrated in FIGS. 4 and 5, the flange member 30 has a tubular part 34 that projects toward the support member 31. The tubular part 34 has an outer diameter surface that radially faces the inner diameter surface of the support member 31. The tubular part 34 has on the outer diameter surface a chamfered part 35 to which the magnetic target 32 is fixed. The support member 31 is provided with an axial groove 36 in which the magnetic sensor element 33 is fixed. The flange member 30 and the support member 31 are made of a magnetic material.

The support member 31 has an annular projection 38 at an outer diameter side of its surface facing the flange member 30. The annular projection 38 supports an outer diameter side of the flange member 30 to provide a distance between the flange member 30 and the support member 31.

The magnetic target 32 comprises two permanent magnets 39 each of which is radially magnetized to have magnetic poles at the radially inner end and the radially outer end thereof, respectively. The two permanent magnets 39 are disposed in such a manner that two magnetic poles of the respective magnets 39 having opposite polarities to each other (i.e., N-pole and S-pole) are placed side by side in the axial direction.

By using neodymium magnets as the permanent magnets 39, the magnets 39 generate a strong magnetic field, thereby improving the resolution of the load sensor 14, while taking up little space. Instead, however, as the permanent magnets 39, samarium-cobalt magnets, Alnico magnets or ferrite magnets may be used. By using samarium-cobalt magnets or Alnico magnets, magnetic fields are less likely to decrease with an increase in temperature of the permanent magnet 39. Further alternatively, praseodymium magnets or samarium iron nitride magnets may be used.

The magnetic sensor element 33 is disposed so as to face the magnetic target 32 in a direction perpendicular to the axial direction (radial direction in the figures) at a position in the vicinity of the boundary between adjacent magnetic poles of the two respective permanent magnets 39. The magnetic sensor element 33 may be a magnetic resistance element (known as an MR sensor) or a magnetic impedance element (known as an MI sensor). However, from an economic viewpoint, a Hall IC is preferable. It is especially advantages to use a Hall IC in an electric brake, in which high friction heat is generated, because heat-resistant Hall IC's are now commercially available.

As illustrated in FIG. 2, the flange member 30 and the support member 31 are provided in the respective outer peripheries thereof with axially extending positioning grooves 40 and 41. A single key member 42 is fitted in the positioning grooves 40 and 41, so that the flange member 30 is circumferentially positioned with respect to the support member 31 to thereby circumferentially align the position of the magnetic target 32 with respect to the magnetic sensor element 33.

Between the carrier 13 and the flange member 30 are mounted a spacer 43 that rotates together with the carrier 13, and a thrust bearing 44 through which an axial load is transmitted between the spacer 43 and the flange member 30. Rolling bearings 45 are mounted inside of the inner periphery of the flange member 30, and rotatably support the rotary shaft 10.

The load sensor 14 is prevented from moving in the axially frontward and rearward directions since the support member 31 and the flange member 30 are engaged at their outer peripheral edges with snap rings 46 and 48 fitted in the inner periphery of the mounting hole 9. The load sensor 14 axially supports the carrier body 13B via the spacer 43 and the thrust bearing 44 so that the carrier 13 is prevented from moving in the axially rearward direction. The carrier 13 is also prevented from moving in the axially frontward direction by a snap ring 47 fitted on the rotary shaft 10 at the axially front end thereof. Accordingly, the carrier 13 is prevented from moving both in the axially forward and rearward directions, whereby the planetary rollers 11 supported by the carrier 13 are prevented from moving in the axial direction.

When the friction pad 7 contacts the brake disk 2 and applies a load to the brake disk 2, the load sensor 14 detects the magnitude of this actual load. Specifically, when the friction pad 7 is pressed against the brake disk 2, the outer ring member 12 receives the reaction force to the load applied to the brake disk 2. The reaction force is then transmitted to the flange member 30 through the planetary rollers 11, the carrier 13, the spacer 43 and the thrust bearing 44. The flange member 30 is deflected by the reaction force in the axially rearward direction, whereby the relative position between the magnetic target 32 and the magnetic sensor element 33 changes. The output signal of the magnetic sensor element 33 changes in response to the changed relative position, so that the load sensor 14 can detect the magnitude of the load applied to the brake disk 2 based on the output signal of the magnetic sensor element 33.

The relative position between the magnetic target 32 and the magnetic sensor element 33 changes, when the friction pad 7 is pressed against the brake disk 2, in a very small amount. If, for example, the brake disk 2 is pressed by a load of 30 kN, the relative position between the magnetic target 32 and the magnetic sensor element 33 changes approximately 0.1 mm in the axial direction, which is very small. According to the present invention, however, since the permanent magnets 39 are arranged such that two magnetic poles of the respective magnets which are opposite in polarity are disposed adjacent to each other in the direction in which the magnetic target 32 and the magnetic sensor element 33 are moved relative to each other, and the magnetic sensor element 33 is placed in the vicinity of the boundary between these two adjacent magnetic poles, the output signal of the magnetic sensor element 33 changes steeply when the relative position between the magnetic target 32 and the magnetic sensor element 33 changes, whereby it becomes possible to highly accurately detect the amount of variation of the relative position between the magnetic target 32 and the magnetic sensor element 33. In addition, since the load sensor 14 uses a variation of the relative position between the magnetic target 32 and the magnetic sensor element 33, which are disposed in a non-contact manner, to detect the magnitude of the load, the load sensor 14 has little mechanical trouble and improved durability, even if it receives impact loads and shearing loads.

Figure 6:
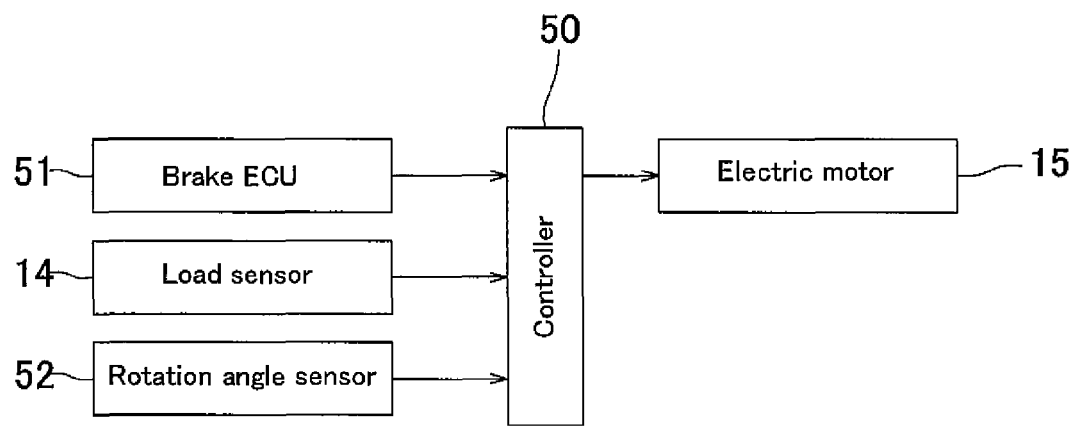
FIG. 6 is a block diagram of a controller that controls an electric motor illustrated in FIG. 1.

The electric motor 15 is controlled by a controller 50 illustrated in FIG. 6. The controller 50 receives a load command value from a brake ECU 51, the detected load from the load sensor 14, and the rotation angle of the electric motor 15 from a rotation angle sensor 52 that detects the rotation angle of the electric motor 15. The rotation angle sensor 52 may be a resolver or a Hall element mounted in the electric motor 15. Alternatively, the rotation angle sensor 52 may comprise a power source device that estimates the rotation angle on the basis of the voltage between lines through which power is supplied to the electric motor 15. The controller 50 performs feedback control on the electric motor such that, based on the difference between the detected load inputted from the load sensor 14 and the load command value inputted from the brake ECU 51, the load applied from the friction pad 7 to the brake disk 2 (hereinafter referred to as "actuator load") becomes equal to the load command value.

An example of an operation of the electric linear motion actuator 1 described above will now be described.

When the electric motor 15 is driven, the rotary shaft 10 rotates, and the planetary rollers 11 rotate about the respective carrier pins 13A and revolve about the rotary shaft 10. As a result, the outer ring member 12 and the planetary rollers 11 are moved in the axial direction relative to each other as the helical rib 22 of the outer ring member 12 is engaged in the circumferential grooves 23 of the planetary rollers 11. However, since the planetary rollers 11, as well as the carrier 13, are prevented from axial movement, the planetary rollers 11 do not axially move in the axial direction, and only the outer ring member 12 actually moves in the axial direction. In this way, the electric linear motion actuator 11 converts the rotational motion of the rotary shaft 10 into a linear motion of the outer ring member 12 to press the friction pad, which is integral with the outer ring member 12, against the brake disk 2 to thereby apply a load from the friction pad 7 to the brake disk 2.

Figure 9:
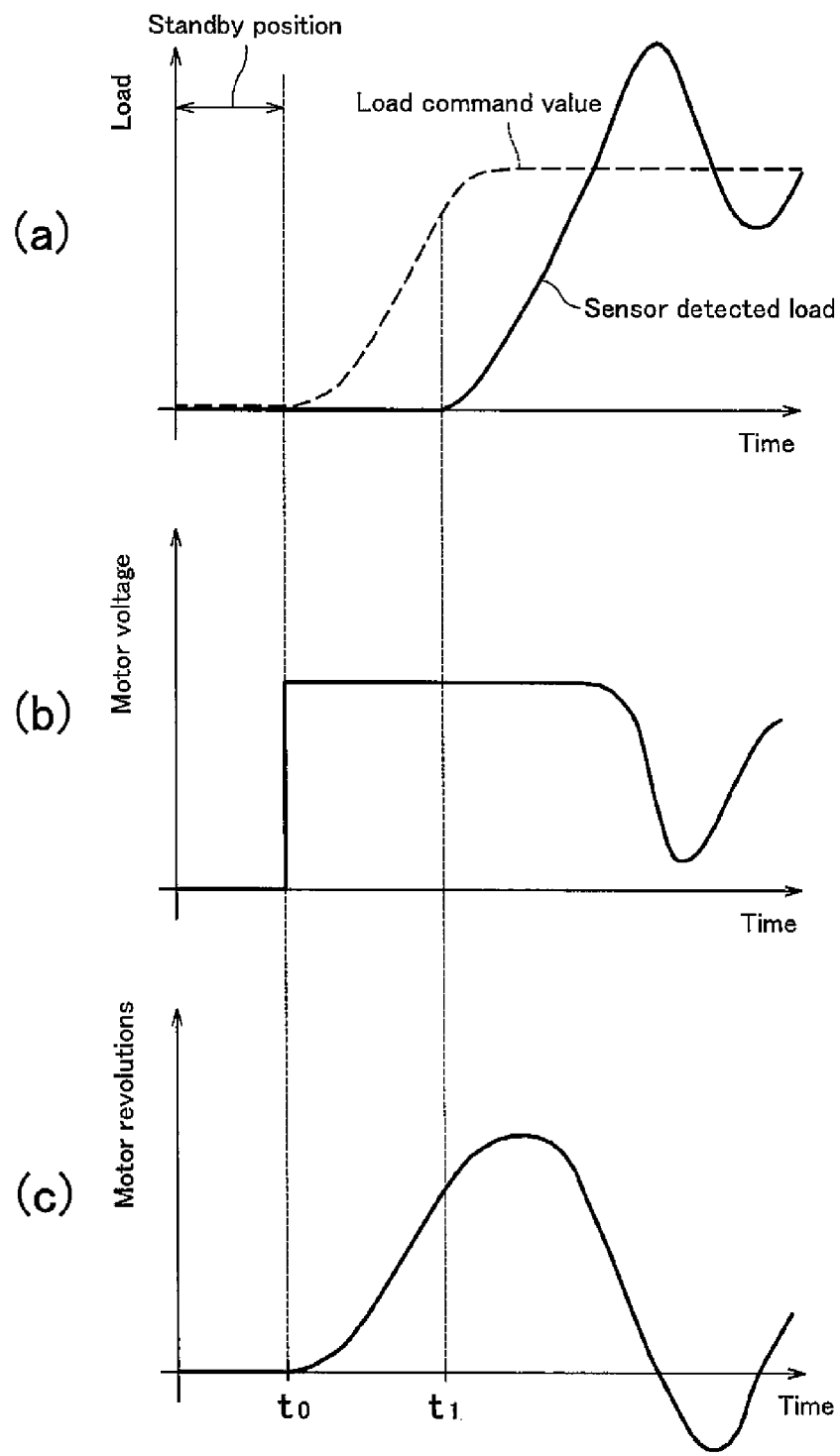

As illustrated in FIG. 9($a$), the electric brake device described above is liable to generate an excessive overshoot when the friction pad 7 moves to apply a load to the brake disk 2 and right after the clearance between the friction pad 7 and the brake disk 2 becomes zero, due to non-linearity in the relation between the position of the friction pad 7 and the load detected by the load sensor 14.

Such an overshoot will be described below with a case wherein the friction pad 7 is moved from the standby position, where the friction pad 7 is spaced apart from the brake disk 2 with a predetermined clearance therebetween, to the load applying position, where the friction pad 7 is in contact with, and applies a load to, the brake disk 2, thereby applying a predetermined target load to the brake disk 2. As illustrated by the time $t_0$ to $t_1$ in FIG. 9($a$), the load sensor 14 continues to detect a load of zero or nearly zero before the clearance between the friction pad 7 and the brake disk 2 becomes zero, so that the difference between the load detected by the load sensor 14 and the load command value remains large. Thus, the friction pad 7 contacts the brake disk 2 with the electric motor 15 rotating at a relatively high speed (i.e., with the electric motor 15 having large inertial energy), regardless of the magnitude of the control gain of the feedback control (time $t_1$ in FIG. 9(a)). Immediately thereafter, due to the inertial energy of the electric motor 15, the load detected by the load sensor 14 sharply and suddenly increases, and could excessively overshoot the load command value (time t1 and thereafter in FIG. 9(a)). The overshoot is liable to be generated especially if the target load is small, and induces a brake shock that adversely affects to the brake feeling.

Figure 8:
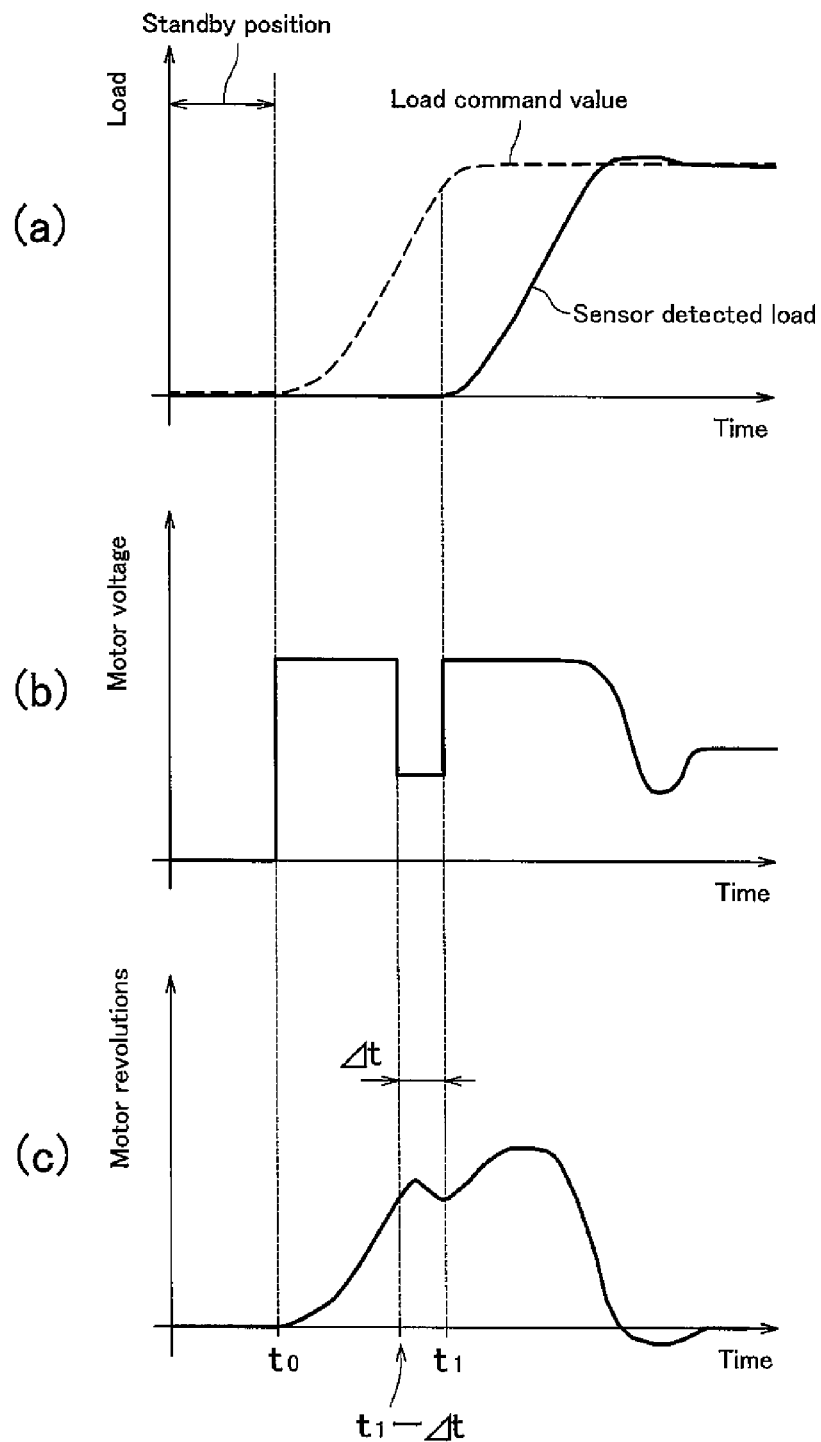

In order to reduce an overshoot that happens right after the clearance between the friction pad 7 and the brake disk 2 becomes zero, the controller 50 is configured to perform an overshoot suppression control shown in FIG. 8(c) in which the number of revolutions of the electric motor 15 is reduced during a predetermined zone immediately before the position where the clearance between the friction pad 7 and the brake disk 2 becomes zero (i.e., right before the friction pad 7 applies a load to the brake disk 2). Such control is described below in detail.

When the friction pad 7 is moved from the standby position, where the friction pad 7 is spaced from the brake disk 2 with a predetermined clearance therebetween, toward the brake disk 2 (time $t_0$ in FIG. 8(c)), the controller 50 performs the feedback control, in which, based on the difference between the load detected by the load sensor 14 and the load command value, the electric motor 15 is controlled such that the actuator load becomes equal to the load command value. As illustrated in FIG. 8(a), time $t_0$ to $t_1$, the load detected by the load sensor 14 remains substantially zero during the feedback control, so that the difference between the load detected by the load sensor 14 and the load command value is not reduced. Thus, the electric motor 15 continues to rotate at a relatively high speed.

Then, when the friction pad 7 moves into the above-described predetermined zone, which is immediately before the position where the friction pad 7 applies a load to the brake disk 2, the controller 50 reduces the number of revolutions of the electric motor 15 (FIG. 8(c), time $t_1$ to $\Delta t$). The controller 50 calculates in advance a range of the rotation angle of the electric motor 15 (range $\Delta\theta$ in FIG. 7) corresponding to the predetermined zone, which is immediately before the position where the clearance between the friction pad 7 and the brake disk 2 becomes zero. Then, the controller 50 determines that the friction pad 7 has moved into the predetermined zone immediately before the position where the clearance becomes zero, when the rotation angle of the electric motor 15 detected by the rotation angle sensor 52 comes into the above calculated range of the rotation angle. Once this determination is made, the controller 50 stops the feedback control based on the difference between the load detected by the load sensor 14 and the load command value, and instead, reduces the voltage applied to the electric motor 15 to a predetermined value (FIG. 8(b), $T_1$ to $\Delta t$). This control reduces the number of revolutions of the electric motor 15, thereby reducing the moving speed of the friction pad 7.

The friction pad 7 then comes into contact with the brake disk 2. Since by this time, the rotational speed of the electric motor 15 is relatively low, an overshoot of the actuator load is less likely to occur (FIG. 8(a), time $t_1$ and thereafter). In other words, the controller 50 provides little brake shock and a good brake feeling. After the clearance between the friction pad 7 and the brake disk 2 becomes zero, the controller 50 again performs the feedback control on the basis of the difference between the load detected by the load sensor 14 and the load command value to thereby increase the actuator load to the target load.

The controller 50 can calculate the range of the rotation angle of the electric motor 15 corresponding to the predetermined zone immediately before the position where the clearance between the friction pad 7 and the brake disk 2 becomes zero, in the following manner. Specifically, the range of the rotation angle of the electric motor 15 corresponding to the predetermined zone immediately before the position where the clearance between the friction pad 7 and the brake disk 2 becomes zero is calculated on the basis of the rotation angle of the electric motor 15 detected by the rotation angle sensor 52 on the basis of the magnitude of load detected by the load sensor 14 during application of a load from the friction pad 7 to the brake disk 2 (e.g., when the brake was applied last time).

Figure 7:
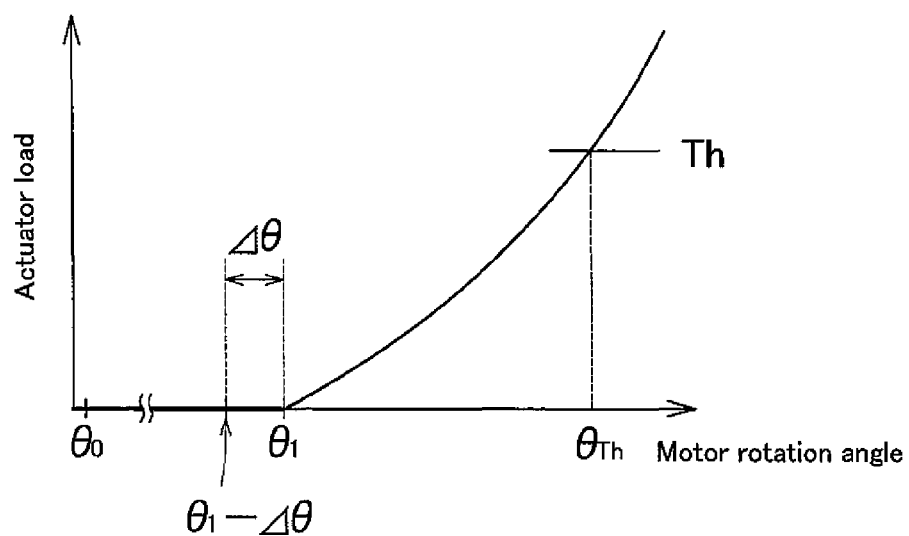
FIG. 7 is a graph indicating the corresponding relation between the rotation angle of the electric motor illustrated in FIG. 1 and the actuator load.

As illustrated in FIG. 7, for example, the controller 50 can calculate the rotation angle $\theta_1$ of the electric motor 15 corresponding to the time when the clearance between the friction pad 7 and the brake disk 2 becomes zero by subtracting a predetermined rotation angle from the rotation angle $\theta_{th}$ of the electric motor 15 detected by the rotation angle sensor 52 when the load detected by the load sensor 14 reaches a predetermined threshold Th such that by subtracting the predetermined rotation angle, the actuator load decreases. The starting point ($\theta_1 - \Delta\theta$ in FIG. 7) of the predetermined zone immediately before the position where the clearance between the friction pad 7 and the brake disk 2 becomes zero can be calculated by further subtracting a predetermined amount $\Delta\theta$. It is possible to determine in advance the corresponding relation between the rotation angle of the electric motor 15 and the actuator by e.g., experiments, based on the reduction gear ratio between the electric motor 15 and the rotary shaft 10, the diameter of the rotary shaft 10, the outer diameter of the planetary rollers 11, the inner diameter of the outer ring member 12, the lead angle of the helical rib 22, the rigidities of the brake disk 2 and the friction pad 7, etc.

By calculating the range of the rotation angle of the electric motor 15 corresponding to the predetermined zone immediately before the position where the clearance between the friction pad 7 and the brake disk 2 becomes zero in the above-described manner, even if the rotation angle of the electric motor 15 when the clearance between the friction pad 7 and the brake disk 2 becomes zero changes due to e.g. wear of the friction pads 7 and 8, since the range of the rotation angle of the electric motor 15 corresponding to the predetermined zone immediately before the position where the clearance between the friction pad 7 and the brake disk 2 becomes zero can be calculated based on the changed rotation angle of the electric motor 15, it is possible to stably and accurately determine that the friction pad 7 has moved into the predetermined zone immediately before the position where the clearance between the friction pad 7 and the brake disk 2 becomes zero.

Similarly, it is also possible to calculate the rotation angle $\theta_0$ of the electric motor 15 when the friction pad 7 is at the standby position, where the friction pad is away from the brake disk 2 with a predetermined clearance, on the basis of the rotation angle $\theta_{th}$ of the electric motor 15. With this, the friction pads 7 and 8 and the brake disk 2 can have a constant clearance therebetween with the friction pads 7 and 8 at the standby position, for a long period of time.

Since the electric brake device described above is configured such that when the friction pad 7 is moved from the standby position, which is away from the brake disk 2 with a predetermined clearance, to the load applying position, where the friction pad 7 contacts the brake disk 2 and applies a load to the disk 2, to thereby apply a target load to the brake disk 2, the number of revolutions of the electric motor 15 is reduced when the friction pad 7 is moved into the predetermined zone (range Δθ in FIG. 7) immediately before the position where the clearance between the friction pad 7 and the brake disk 2 becomes zero, an overshoot is less likely to occur right after the clearance between the friction pad 7 and the brake disk 2 becomes zero, thereby providing little brake shock and presenting an improved brake feeling.

In addition, the number of revolutions of the electric motor 15 decreases only in the predetermined zone immediately before the position where the clearance between the friction pad 7 and the brake disk 2 becomes zero, so that the electric motor 15 rotates at a relatively high speed until the friction pad 7 comes into the predetermined zone. Thus, the friction pad 7 can move faster than a case where the number of revolutions of the electric motor 15 is reduced in the entire zone from the position where the friction pad 7 begins to move to the position where the clearance between the friction pad 7 and the brake disk 2 becomes zero. This can provide the actuator of the present invention an excellent responsiveness.

The position of the friction pad 7 may be detected by e.g. a linear displacement sensor. However, as in the embodiment described above, the position of the friction pad 7 is preferably be detected by the rotation angle sensor 52 for the electric motor 15, because with the latter arrangement, the rotation angle sensor 52 can detect the position of the friction pad 7 with high resolution on the basis of the rotation angle of the electric motor 15 detected by the rotation angle sensor 52. Thus, the detection by the rotation angle sensor 15 can determine highly accurately whether the friction pad 7 has moved into the predetermined zone immediately before the position where the clearance between the friction pad 7 and the brake disk 2 becomes zero.

In the above embodiment, when the friction pad 7 moves into the predetermined zone immediately before the position where the clearance between the friction pad 7 and the brake disk 2 becomes zero, the voltage applied to the electric motor 15 is reduced to a predetermined value to reduce the number of revolutions of the electric motor 15. However, a different control arrangement may be used.

For example, the controller may be configured to perform a feedback control on the electric motor 15 in which based on the difference between the number of revolutions of the electric motor 15 and a predetermined smaller number of revolutions, the number of revolutions of the electric motor 15 is reduced to the predetermined smaller number of revolutions. The number of revolutions of the electric motor 15 can be calculated by time-differentiating the rotation angle of the electric motor 15 detected by the rotation angle sensor 52.

If the electric motor 15 is driven by a rectangular pulse voltage generated by repeatedly and discontinuously applying a constant voltage, a control arrangement may be used in which the duty ratio, namely, the ratio of the time during which the voltage is being applied to the sum of the time during which the voltage is being applied and the time during which the voltage is not being applied is reduced to a predetermined value or lower in advance (this control is known as "PWM control"). If the electric motor 15 is driven by a rectangular pulse voltage generated by being repeatedly turned on and turned off, a control arrangement may be used in which the pulse amplitude of the voltage applied to the electric motor 15 is reduced to a predetermined value or lower (this control is known as "PAM control").

In the embodiment, the motion converting mechanism B, which converts the rotational motion of the electric motor 15 into a linear motion of the linear moving member A (the outer ring member 12 and the friction pad 7), includes the rotary shaft 10, which is rotated by the electric motor 15, the plurality of planetary rollers 11, which are in rolling contacts with the cylindrical outer circumference surface of the rotary shaft 10, the carrier 13, which is prevented from axial movement and retains the planetary rollers 11 in such a manner that the rollers 11 each can rotate and revolve, the outer ring member 12, which surrounds the planetary rollers 11, the helical rib provided on the inner circumference of the outer ring member 12, and the circumferential grooves 23 provided on the outer circumferences of the respective planetary rollers 11 so as to engage with the helical rib 22 of the outer ring member 12. However, the present invention is applicable to an electric linear motion actuator using a different motion converting mechanism B.

Figure 10:
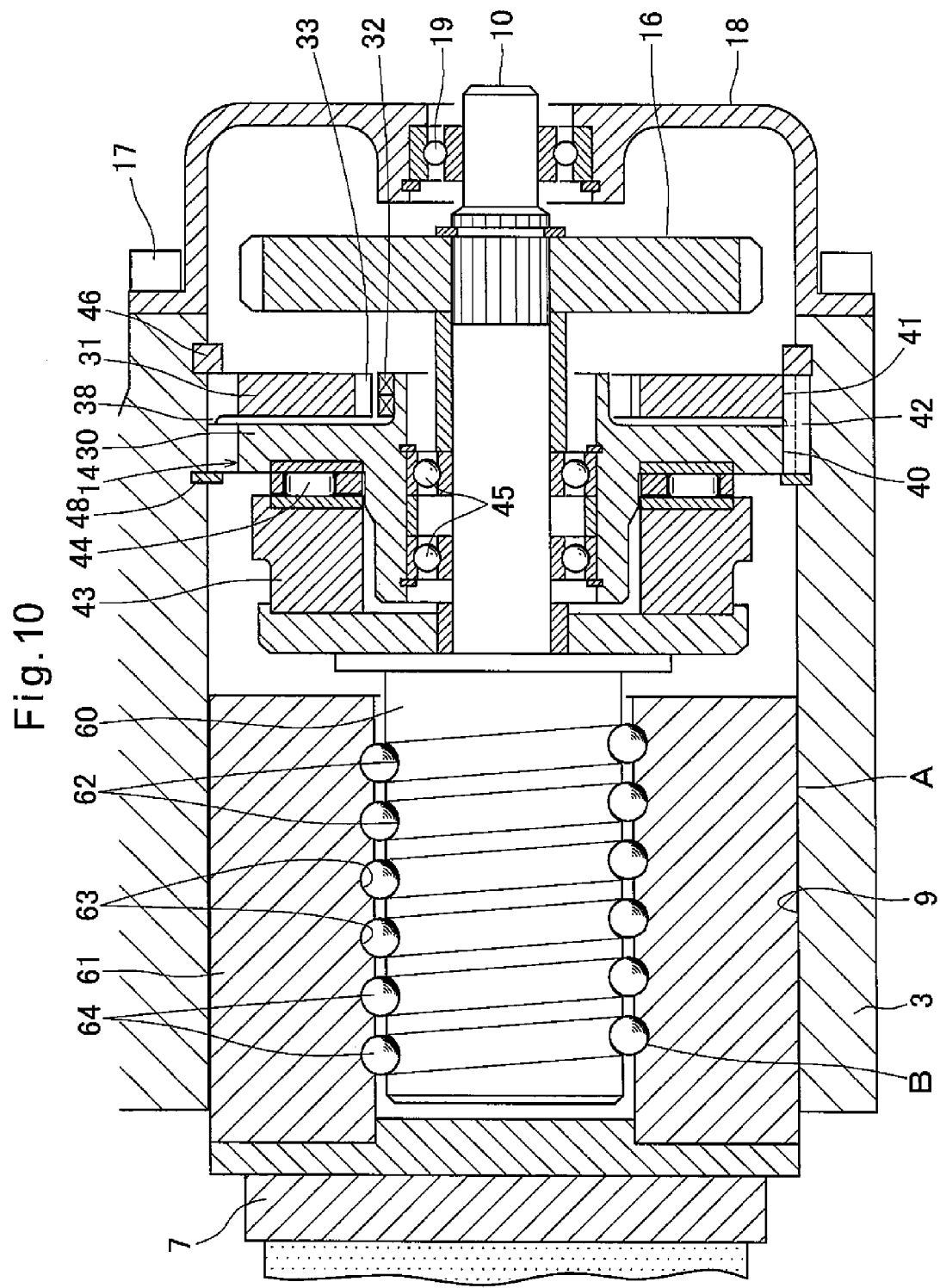
FIG. 10 is an enlarged sectional view illustrating an example of an electric linear motion actuator that employs a ball-screw mechanism.

By way of example, FIG. 10 shows an electric linear motion actuator including a ball-screw type motion converting mechanism B. Below, elements corresponding to those in the embodiment are denoted by identical reference numerals and their description is omitted.

As illustrated in FIG. 10, the electric linear motion actuator includes a rotary shaft 10 rotated by an electric motor 15, a threaded shaft 60 integral with the rotary shaft 10 and formed with a thread groove 62 in the outer circumference thereof, a nut 61 surrounding the threaded shaft 60 and formed with a thread groove 63 in the inner circumference thereof, and a plurality of balls 64 disposed between the thread groove 62 of the threaded shaft 60 and the thread groove 63 of the nut 61. The actuator further includes a return tube (not illustrated) through which the balls 64 are returned from the terminal point to the starting point, of the thread groove 63, and the load sensor 14, which is disposed axially rearwardly of the nut 61.

The nut 61 is mounted in the mounting hole 9 formed in the facing member 3 of the caliper body 6 so as to be rotationally fixed and axially slidable relative to the caliper body 6. The threaded shaft 60 is integrally provided at the axially rear end thereof with a spacer 43 that rotates together with the threaded shaft 60. The spacer 43 is supported by the load sensor 14 via a thrust bearing 44. The load sensor 14 axially supports the nut 61 through the spacer 43, the thrust bearing 44 and the threaded shaft 60, whereby the nut 61 is prevented from axially rearward movement.

The electric linear motion actuator operates in such a manner that the rotary shaft 10 rotates to turn the threaded shaft 60 relative to the nut 61 to thereby move the nut 61 in the axially forward direction. The friction pads 7 and 8 are thus pressed against the brake disk 2 by the nut 61 and the facing member 4 of the caliper body 6 to generate a braking force. At this time, the threaded shaft 60 receives the reaction force in the axially rearward direction, which reaction force is transmitted to the load sensor 14 through the spacer 43 and the thrust bearing 44.

Figure 11:
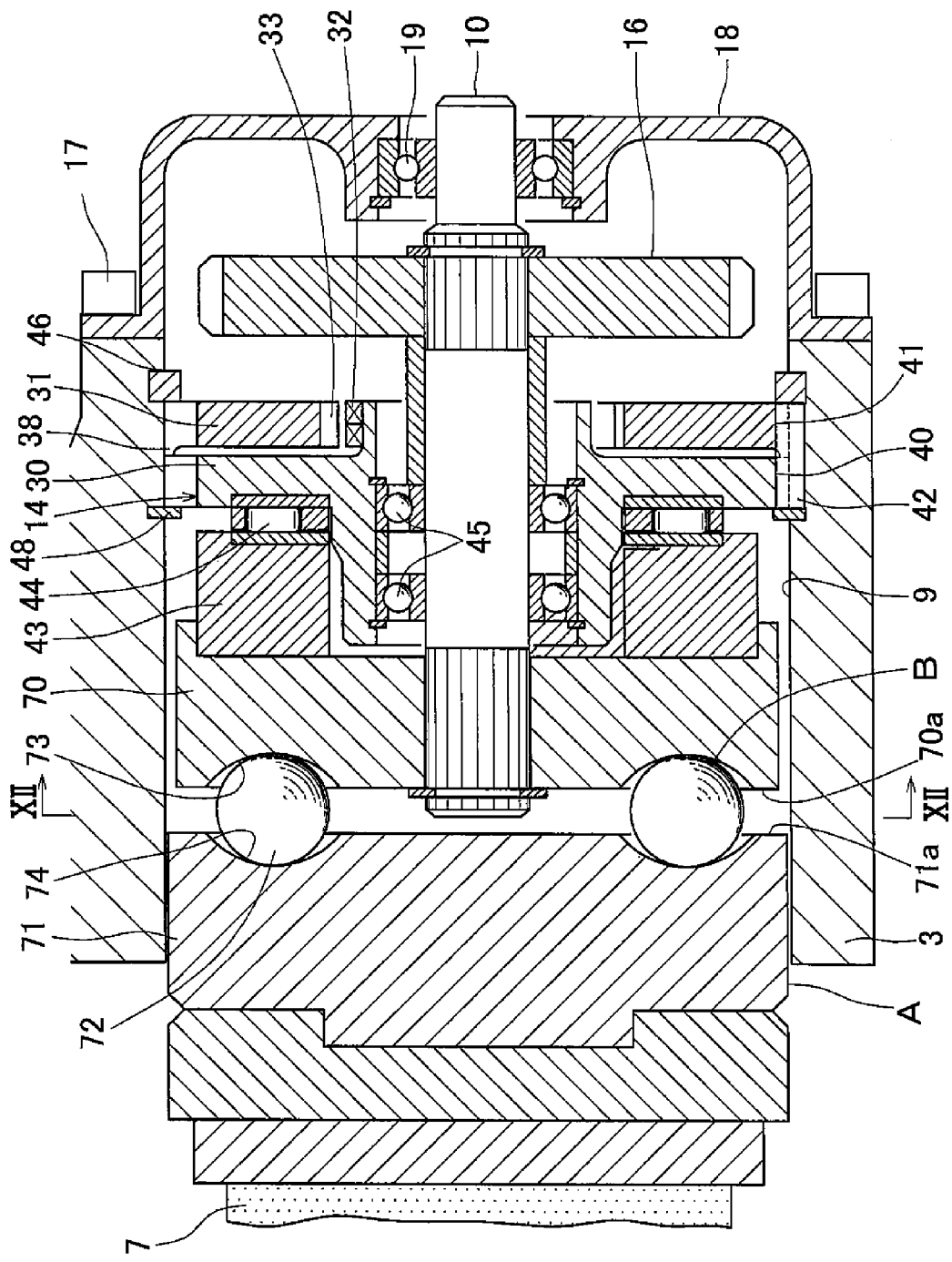
FIG. 11 is an enlarged sectional view illustrating an example of an electric linear motion actuator that employs a ball-ramp mechanism.

FIG. 11 shows an electric linear motion actuator including a ball-ramp type motion converting mechanism B as the motion converting mechanism B.

As illustrated in FIG. 11, the electric linear motion actuator includes a rotary shaft 10, a rotary disk 70 rotationally fixed to the outer periphery of the rotary shaft 10, a linear motion disk 71 disposed axially forward of, and axially facing, the rotary disk 70, a plurality of balls 72 sandwiched between the rotary disk 70 and the linear motion disk 71, and the load sensor 14, which is disposed axially rearwardly of the linear motion disk 71.

The linear motion disk 71 is mounted in the mounting hole 9 formed in the facing member 3 of the caliper body 6 so as to be rotationally fixed and axially slidable relative to the caliper body 6. The rotary disk 70 is provided at the axially rear end thereof with a spacer 43 that rotates together with the rotary disk 70. The spacer 43 is supported by the load sensor via a thrust bearing 44. The load sensor 14 axially supports the rotary disk 70 through the spacer 43 and the thrust bearing 44, so that the rotary disk 70 is prevented from axial movement.

Figure 12:
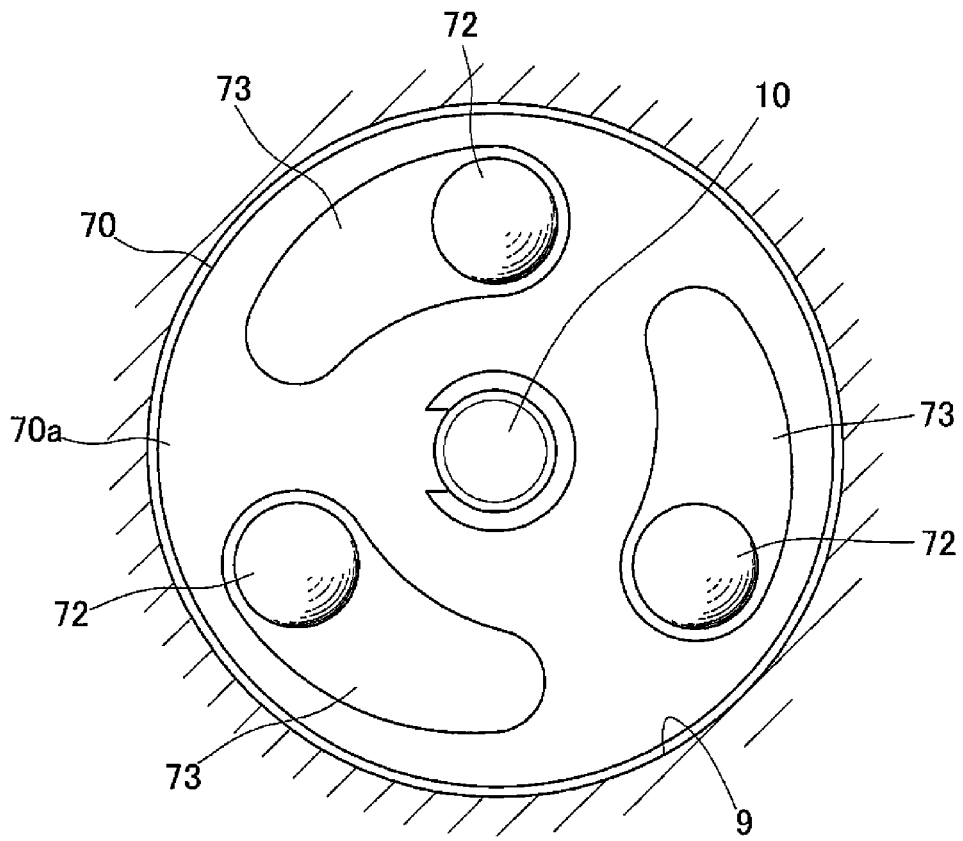
FIG. 12 is a sectional view along line XII-XII in FIG. 11.
Figure 13:
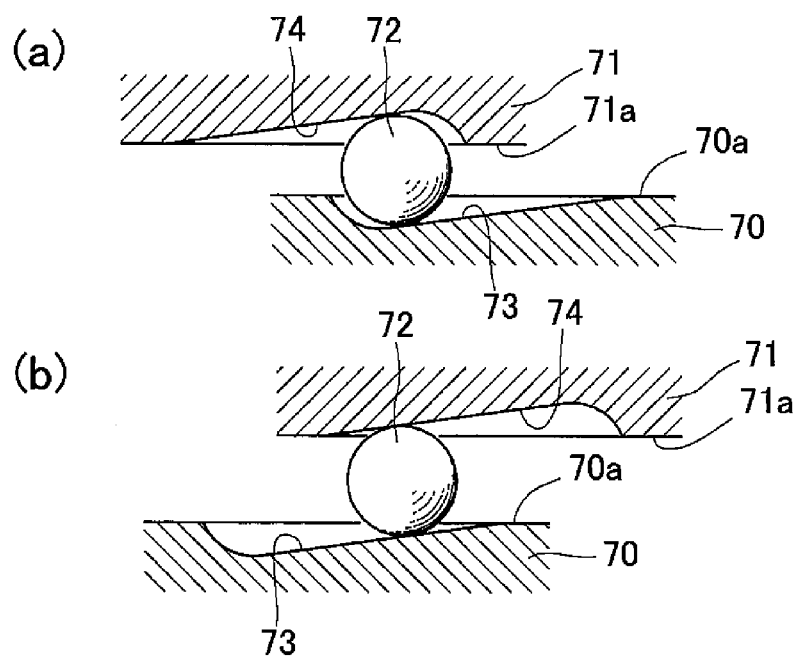

As illustrated in FIGS. 12 and 13, the rotary disk 70 is formed, in its surface 70a facing the liner motion disk 71, with inclined grooves 73 each having a depth that gradually decreases in one circumferential direction. The linear motion disk 71 has, in its surface 71a facing the rotary disk 70, inclined grooves 74 each having a depth that gradually decreases in the other circumferential direction. As illustrated in FIG. 13(a), the balls 72 are mounted between the respective inclined grooves 73 of the rotary disk 70 and the respective inclined grooves 74 of the linear motion disk 71. As illustrated in FIG. 13(b), when the rotary disk 70 rotates relative to the linear motion disk 71, the balls 72 roll in the respective pairs of inclined grooves 73 and 74 such that the distance between the rotary disk 70 and the linear motion disk 71 increases.

The electric linear motion actuator operates such that the linear motion disk 71 and the rotary disk 70 rotate relative to each other by the rotation of the rotary shaft 10 to thereby move the linear motion disk 71 in the axially forward direction. As a result, the friction pads 7 and 9 are pressed against the brake disk 2 by the linear motion disk 71 and the facing member 4 of the caliper body 6 to thereby generate a braking force. The linear motion disk 71 in turn receives the reaction force in the axially rearward direction, which reaction force is transmitted to the load sensor 14 through the spacer 43 and the thrust bearing 44.

DESCRIPTION OF REFERENCE NUMERALS 1 electric linear motion actuator
2 brake disk
7 friction pad
14 load sensor
15 electric motor
50 controller
52 rotation angle sensor
A linear moving member
B motion converting mechanism
$\theta_{Th}$ rotation angle

The invention claimed is:

1. An electric linear motion actuator comprising:
   an electric motor;
   a linear moving member capable of moving between a standby position where the linear moving member is spaced apart from a target with a predetermined clearance between the linear moving member and the target and a load applying position where the linear moving member contacts the target to apply a load to the target;
   a motion converting mechanism that converts a rotational motion of the electric motor into a linear motion of the linear moving member;
   a load sensor that detects a magnitude of the load applied to the target from the linear moving member; and
   a controller configured to perform a feedback control in which based on a difference between the load detected by the load sensor and a load command value, the electric motor is controlled so that the load applied from the linear moving member to the target becomes equal to the load command value,
   wherein the controller comprises an overshoot suppression control means configured to reduce a number of revolutions of the electric motor when the linear moving member moves from the standby position toward the load applying position to apply a load to the target and moves into a predetermined zone immediately before the position where the clearance between the linear moving member and the target becomes zero.

2. The electric linear motion actuator of claim 1, further comprising a rotation angle sensor that detects a rotation angle of the electric motor;
   wherein the overshoot suppression control means is configured to determine whether the linear moving member has moved into the predetermined zone, which is immediately before the position where the clearance between the linear moving member and the target becomes zero, on the basis of the rotation angle of the electric motor detected by the rotation angle sensor.

3. The electric linear motion actuator of claim 2, wherein the overshoot suppression control means is configured to calculate a range of the rotation angle of the electric motor corresponding to the predetermined zone, which is immediately before the position where the clearance between the linear moving member and the target becomes zero, based on a magnitude of a predetermined load detected by the load sensor while the linear moving member is applying a load to the target, and with reference to a rotation angle of the electric motor detected by the rotation angle sensor when the magnitude of the predetermined load is detected by the load sensor; and
   the overshoot suppression control means is further configured to determine that the linear moving member has moved into the predetermined zone, which is immediately before the position where the clearance between the linear moving member and the target becomes zero, when the rotation angle of the electric motor detected by the rotation angle sensor moves within the range of the rotation angle.

4. The electric linear motion actuator of claim 1, wherein the overshoot suppression control means is configured to change a voltage applied to the electric motor such that the number of revolutions of the electric motor decreases, when the linear moving member moves into the predetermined zone, which is immediately before the position where the clearance between the linear moving member and the target becomes zero.

5. The electric linear motion actuator of claim 1, wherein the overshoot suppression control means is configured to reduce a voltage to be applied to the electric motor to a predetermined value, when the linear moving member moves into the predetermined zone, which is immediately before the position where the clearance between the linear moving member and the target becomes zero.

6. The electric linear motion actuator of claim 1, wherein the overshoot suppression control means is configured to perform feedback control on the electric motor in which based on a difference between the number of revolutions of the electric motor and a predetermined small number of revolutions, the number of revolutions of the electric motor is reduced to the predetermined small number of revolutions, when the linear moving member moves into the predetermined zone, which is immediately before the position where the clearance between the linear moving member and the target becomes zero.

7. The electric linear motion actuator of any one of claim 1, wherein the electric motor is configured to be driven by a pulse voltage generated by repeatedly and discontinuously applying a constant voltage; and the overshoot suppression control means is configured to reduce a ratio of a turned-on time during which the constant voltage is being applied to a sum of the turned-on time and a turned-off time during which the constant voltage is not being applied, when the linear moving member moves into the predetermined zone, which is immediately before the position where the clearance between the linear moving member and the target becomes zero.

8. The electric linear motion actuator of claim 1, wherein the electric motor is driven by a pulse voltage generated by being repeatedly turned on and turned off; and the overshoot suppression control means is configured to reduce a pulse amplitude of the pulse voltage, which is applied to the electric motor, when the linear moving member moves into the predetermined zone, which is immediately before the position where the clearance between the linear moving member and the target becomes zero.

* * * * *